United States Patent
Ohkuma

(10) Patent No.: US 7,443,887 B2
(45) Date of Patent: Oct. 28, 2008

(54) PACKET PROCESSING CIRCUIT

(75) Inventor: Takahiro Ohkuma, Tokyo (JP)

(73) Assignee: NEC Corporation (JP)

( * ) Notice: Subject to any disclaimer, the term of this patent is extended or adjusted under 35 U.S.C. 154(b) by 799 days.

(21) Appl. No.: 10/791,784

(22) Filed: Mar. 4, 2004

(65) Prior Publication Data
US 2004/0174906 A1 Sep. 9, 2004

(30) Foreign Application Priority Data
Mar. 5, 2003 (JP) ............... 2003-057893

(51) Int. Cl.
H04J 3/06 (2006.01)
(52) U.S. Cl. ..................... 370/503; 370/463
(58) Field of Classification Search ........ 370/536, 370/311, 542, 252, 503, 463; 713/320, 322
See application file for complete search history.

(56) References Cited
U.S. PATENT DOCUMENTS
4,316,247 A * 2/1982 Iwamoto ............... 713/321
4,698,748 A * 10/1987 Juzswik et al. ........... 713/322
6,728,271 B1 * 4/2004 Kawamura et al. ........ 370/536
2002/0007463 A1 * 1/2002 Fung ..................... 713/320
2003/0110406 A1 * 6/2003 Takada .................. 713/320
2004/0160898 A1 * 8/2004 Lim et al. ............... 370/252
2006/0059377 A1 * 3/2006 Sherburne .............. 713/300
2006/0259797 A1 * 11/2006 Fung ..................... 713/300

FOREIGN PATENT DOCUMENTS
JP 2001-177382 A1 6/2001

* cited by examiner

Primary Examiner—Kwang B. Yao
Assistant Examiner—Kenan Cehic
(74) Attorney, Agent, or Firm—Dickstein, Shapiro, LLP.

(57) ABSTRACT

A packet processing circuit includes a plurality of macros and a clock supply unit. Each of the macros processes packet data on the basis of a clock and outputs the processed packet data from at least one route. The macros are cascade-connected. The clock supply unit supplies the clock to a macro to be controlled and, when no packet data is output for a predetermined time from all routes of a macro on the input side of the macro to be controlled, stops supplying the clock to the macro to be controlled.

3 Claims, 3 Drawing Sheets

PACKET PROCESSING CIRCUIT

BACKGROUND OF THE INVENTION

The present invention relates to a packet processing circuit and, more particularly, to a technique for reducing the power consumption of a packet processing circuit.

In the Internet society, as broadband networks and leased circuit type IP connection are spreading, increases in power of apparatuses and full-time energization are causing problems of power cost and global warming.

Generally, however, in the lines of an access system, the time in which packets are actually transmitted is very short. In most time, no packets are transmitted. Even in this state, a general packet processing circuit always receives clocks and consumes power independently of the presence/absence of a packet.

To reduce the power consumption in a conventional packet processing circuit, a technique has been proposed, in which a gate signal is applied, for each word of data, to clocks of a flip-flop, thereby validating the clocks only when the data changes (e.g., Japanese Patent Laid-Open No. 2001-177382 (pp. 7-10, FIG. 1)).

However, in this technique, the gating unit is small, and the number of control circuits increases.

SUMMARY OF THE INVENTION

It is therefore a main object of the present invention to provide a packet processing circuit capable of suppressing the power consumption without increasing the number of control circuits.

In order to achieve the above object, according to the present invention, there is provided a packet processing circuit comprising a plurality of macros each of which processes packet data on the basis of a clock and outputs the processed packet data from at least one route, the macros being cascade-connected, and a clock supply unit which supplies the clock to a macro to be controlled and, when no packet data is output for a predetermined time from all routes of a macro on an input side of the macro to be controlled, stops supplying the clock to the macro to be controlled.

DESCRIPTION OF THE PREFERRED EMBODIMENTS

The embodiments of the present invention will be described below with reference to the accompanying drawings.

First Embodiment

Figure 1:
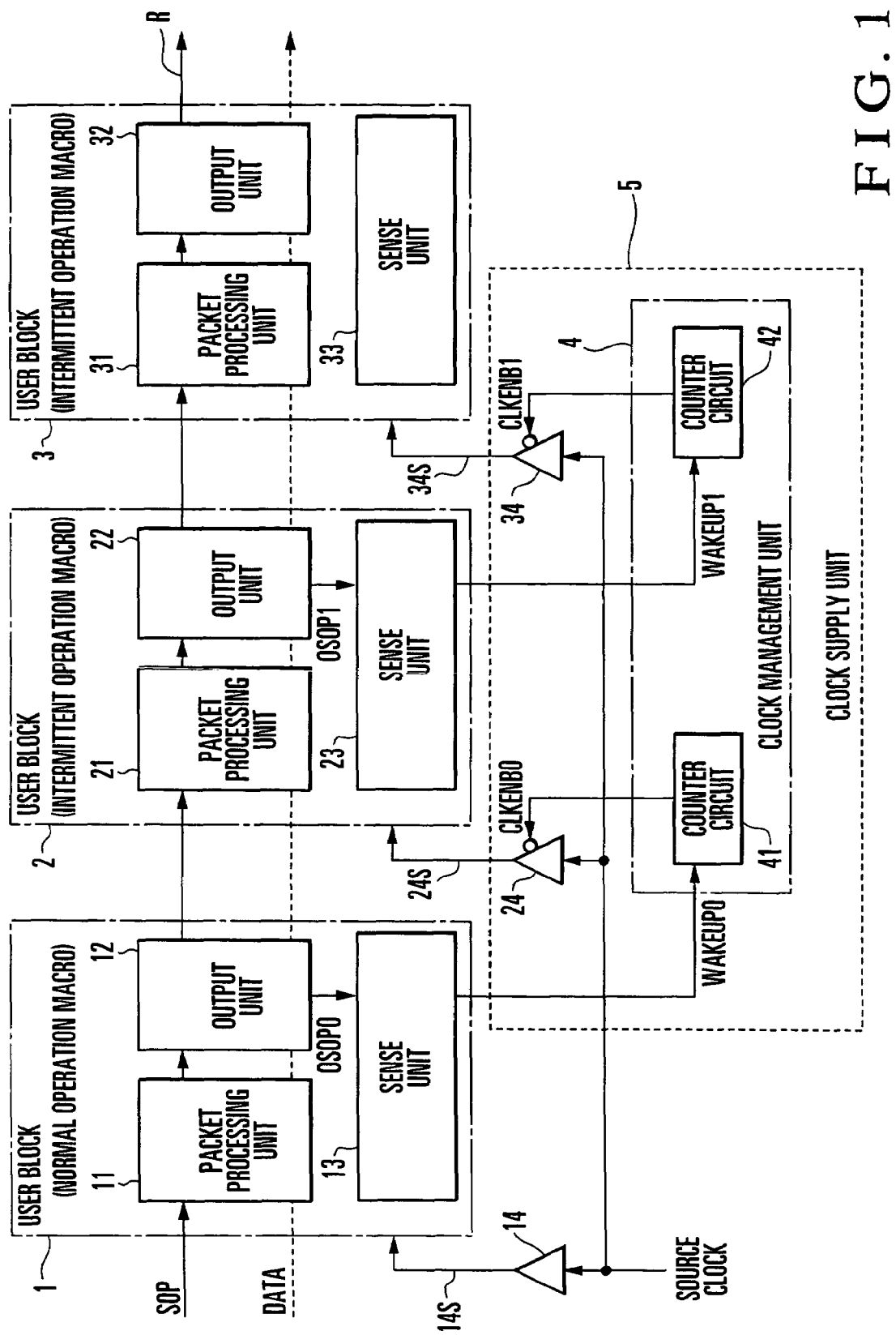
FIG. 1 is a block diagram showing the arrangement of a packet processing circuit according to the first embodiment of the present invention.

FIG. 1 shows the arrangement of a packet processing circuit according to the first embodiment of the present invention. The packet processing circuit shown in FIG. 1 has a user block 1, user block 2, and user block 3, which constitutes a three-stage macro, a clock buffer 14 which always supplies a clock 14S to the user block 1, and a clock supply unit 5 which appropriately supplies clocks 24S and 34S, respectively, to the user block 2 and user block 3.

The user blocks 1, 2, and 3 are cascade-connected in this order. A packet SOP flows through user block 1→ user block 2→ user block 3 in this order and processed by each user block. The clock 14S is always supplied to the user block 1 so that the user block 1 functions as a normal operation macro. To the contrary, the clocks 24S and 34S are not always supplied to the user blocks 2 and 3. Each of the user blocks 2 and 3 functions as an intermittent operation macro. A macro means a block set in which a plurality of logic blocks collect and implement one function.

The arrangement of the user block 1 will be described in more detail. The user block 1 is constituted by a packet processing unit 11, output unit 12, and sense unit 13.

The packet processing unit 11 processes the input packet SOP and outputs the processed packet to the output unit 12.

The output unit 12 outputs the packet input from the packet processing unit 11 to the user block 2 on the output side. In outputting the packet, the output unit 12 also outputs, to the sense unit 13, a second packet output notification signal which indicates that the packet is output. The output unit 12 also functions as a second signal output unit. In this embodiment, an output packet start position identification signal OSOP (Output Start Of Packet) 0 representing the start position of the packet is output to the sense unit 13 as the second packet output notification signal.

Upon receiving the output packet start position identification signal OSOP0 from the output unit 12, the sense unit 13 outputs, to the clock supply unit 5, a first packet output notification signal WAKEUP0 which indicates that the packet is output from the user block 1. The sense unit 13 therefore functions as a first signal output unit. The sense unit 13 can be implemented by a flip-flop.

The units 11 to 13 of the user block 1 operate in accordance with the clock 14S input from the clock buffer 14.

Like the user block 1, the user block 2 is constituted by a packet processing unit 21, output unit 22, and sense unit 23. The units 21 to 23 operate in accordance with the clock 24S input from the clock supply unit 5.

The user block 3 is constituted by a packet processing unit 31, output unit 32, and sense unit 33. The units 31 to 33 operate in accordance with the clock 34S input from the clock supply unit 5. Since the user block 3 corresponds to the final stage, the output unit 32 need not always have the function as the second signal output unit, and the sense unit 33 may be omitted.

The arrangement of the clock supply unit 5 will be described next in more detail. The clock supply unit 5 has a function of stopping supplying the clocks 24S and 34S to the user blocks 2 and 3 to be controlled when no packet is output, for a predetermined time, from the user blocks 1 and 2 on the input side of the user blocks 2 and 3 to be controlled. To implement this function, the clock supply unit 5 has clock buffers 24 and 34, and a clock management unit 4.

The clock buffer 24 supplies the clock 24S to the user block 2. The clock buffer 34 supplies the clock 34S to the user block 3.

When no packet is output for a predetermined time from the user blocks 1 and 2 on the input side of the user blocks 2 and 3 to be controlled, the clock management unit 4 causes the clock buffers 24 and 34 corresponding to the user blocks 2 and 3 to be controlled to stop supplying the clocks 24S and 34S. To implement this function, the clock management unit 4 has counter circuits 41 and 42.

The first packet output notification signal WAKEUP0 is input from the user block 1 to the counter circuit 41. The counter circuit 41 outputs, to the clock buffer 24, a control signal CLKENB0 which controls output of the clock 24S. When the first packet output notification signal WAKEUP0 changes from Low to High (i.e., ON), the counter circuit 41 changes the control signal CLKENB0 from Low to High to cause the clock buffer 24 to start supplying the clock 24S to the user block 2. When the first packet output notification signal WAKEUP0 has not changed from Low to High again within a predetermined time, the counter circuit 41 changes the control signal CLKENB0 from High to Low to cause the clock buffer 24 to stop supplying the clock 24S. In the counter circuit 41, the predetermined time after the control signal CLKENB0 is changed to High until it is changed to Low is detected by counting the number of clocks.

More specifically, a default value is given to the counter circuit 41. For example, the number of clocks necessary until a packet passes through the user block 1 on the input side of the user block 2 to be controlled is given as the default value. When the first packet output notification signal WAKEUP0 changes from Low to High, and the control signal CLKENB0 changes from Low to High, the counter circuit 41 sets the default value and starts countdown. When the counter value becomes "0", the control signal CLKENB0 is changed from High to Low. After that, when the first packet output notification signal WAKEUP0 changes from Low to High while the control signal CLKENB0 remains Low, the counter circuit 41 is reset and restarts countdown from the default value. Even when the first packet output notification signal WAKEUP0 changes from Low to High while the control signal CLKENB0 remains High, i.e., halfway during countdown, the counter circuit 41 is reset and restarts countdown from the default value.

The counter circuit 42 has the same function as that of the counter circuit 41 except it receives a first packet output notification signal WAKEUP1 from the user block 2. In addition, the counter circuit 42 outputs, to the clock buffer 34, a control signal CLKENB1 which controls output of the clock 34S.

The operation of the packet processing circuit shown in FIG. 1 will be described next with reference to FIGS. 2A to 2K. FIGS. 2A to 2K show the signals of the units in the packet processing circuit.

Figure 2:
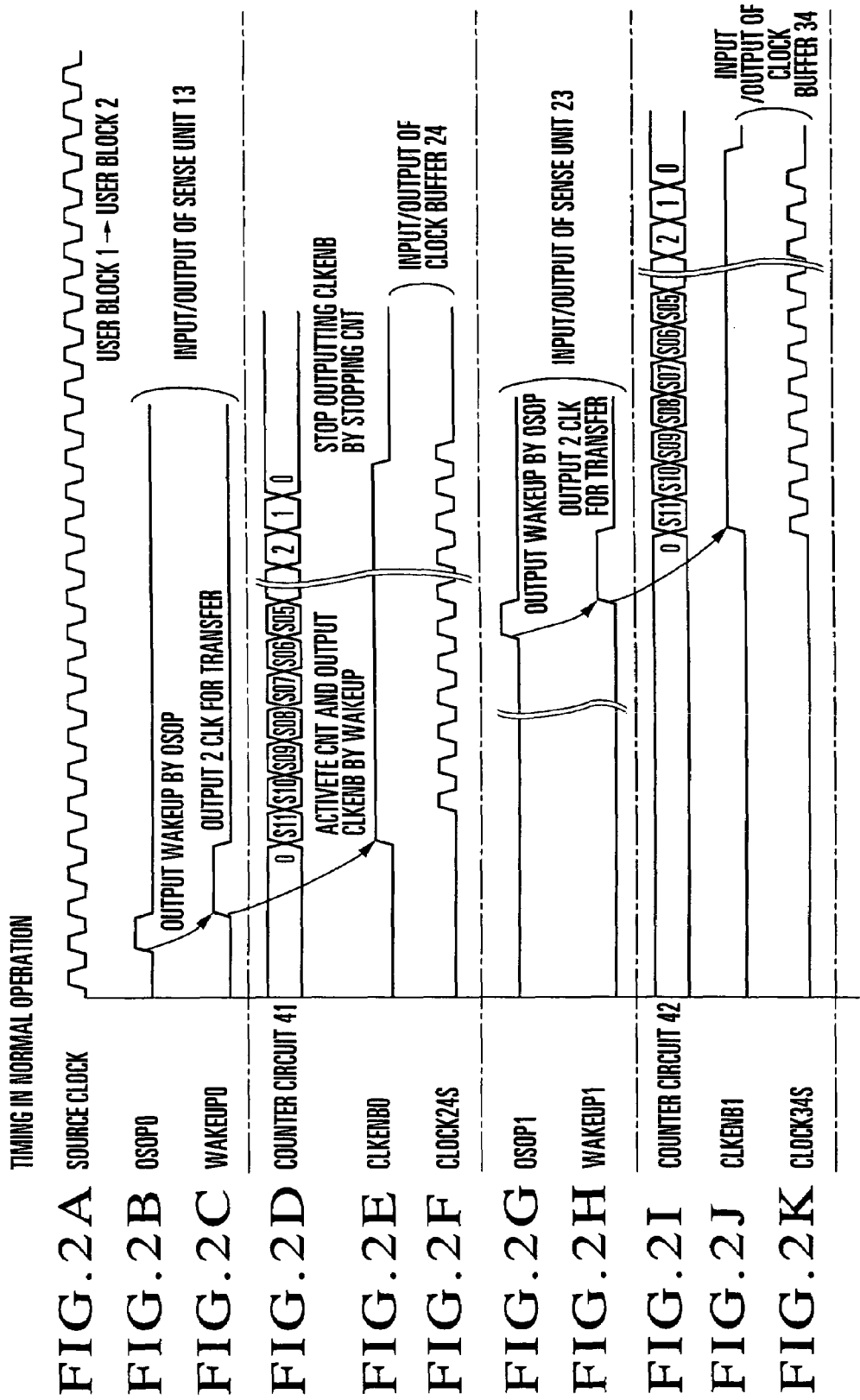
FIGS. 2A to 2K are timing charts showing the signals of units in the packet processing circuit according to the first embodiment of the present invention.

FIG. 2A shows Source Clock which is supplied to the clock buffers 14, 24, and 34.

When the output packet start position identification signal OSOP0 changes from Low to High (FIG. 2B), the sense unit 13 of the user block 1 changes the packet output notification signal WAKEUP0 from Low to High and outputs it to the clock management unit 4 (FIG. 2C).

When the packet output notification signal WAKEUP0 changes from Low to High, the counter circuit 41 of the clock management unit 4 is reset and starts countdown from the default value (FIG. 2D). In the example shown in FIG. 2D, the default value is "511".

At this time, the control signal CLKENB0 from the counter circuit 41 to the clock buffer 24 changes from Low to High (FIG. 2E) so that the clock buffer 24 restarts supplying the clock 24S to the user block 2 to be controlled (FIG. 2F). After that, when the count value of the counter circuit 41 becomes "0", the control signal CLKENB0 changes from High to Low (FIG. 2E) so that supply of the clock 24S is stopped (FIG. 2F).

When an output packet start position identification signal OSOP1 changes from Low to High (FIG. 2G), the sense unit 23 of the user block 2 changes the packet output notification signal WAKEUP1 from Low to High and outputs it to the clock management unit 4 (FIG. 2H).

When the packet output notification signal WAKEUP1 changes from Low to High, the counter circuit 42 of the clock management unit 4 is reset and starts countdown from the default value (FIG. 2I). In the example shown in FIG. 2I, the default value is "511".

At this time, the control signal CLKENB1 from the counter circuit 42 to the clock buffer 34 changes from Low to High (FIG. 2J) so that the clock buffer 34 restarts supplying the clock 34S to the user block 3 to be controlled (FIG. 2K). After that, when the count value of the counter circuit 42 becomes "0", the control signal CLKENB1 changes from High to Low (FIG. 2J) so that supply of the clock 34S is stopped (FIG. 2K).

With this arrangement, supply of the clocks 24S and 34S to the user blocks 2 and 3 to be controlled can be stopped when no packet is output, for a predetermined time, from the user blocks 1 and 2 on the input side of the user blocks 2 and 3 to be controlled. In, e.g., an LSI (Large Scale Integrated circuit) having a CMOS (Complementary Metal Oxide Semiconductor) structure, the power consumption can be reduced to almost zero by fixing the clock at Low. According to the packet processing circuit shown in FIG. 1, when there is no packet to be processed, supply of the clocks 24S and 34S to the packet processing circuits 2 and 3 is stopped completely. With this arrangement, the power consumption of the packet processing units 21 and 31 and the output units 22 and 32 can be suppressed to reduce the power consumption.

When the power consumption is suppressed, the heating value of the circuit can be suppressed, and therefore, the problem of heat can be solved.

When heating is suppressed, the heat dissipation device such as a heat sink can be omitted or made compact. Hence, the circuit can be made compact.

That is, according to the packet processing circuit shown in FIG. 1, the power consumption can be suppressed without increasing the number of control circuits. Accordingly, the heating value of the circuit can also be suppressed.

Second Embodiment

Figure 3:
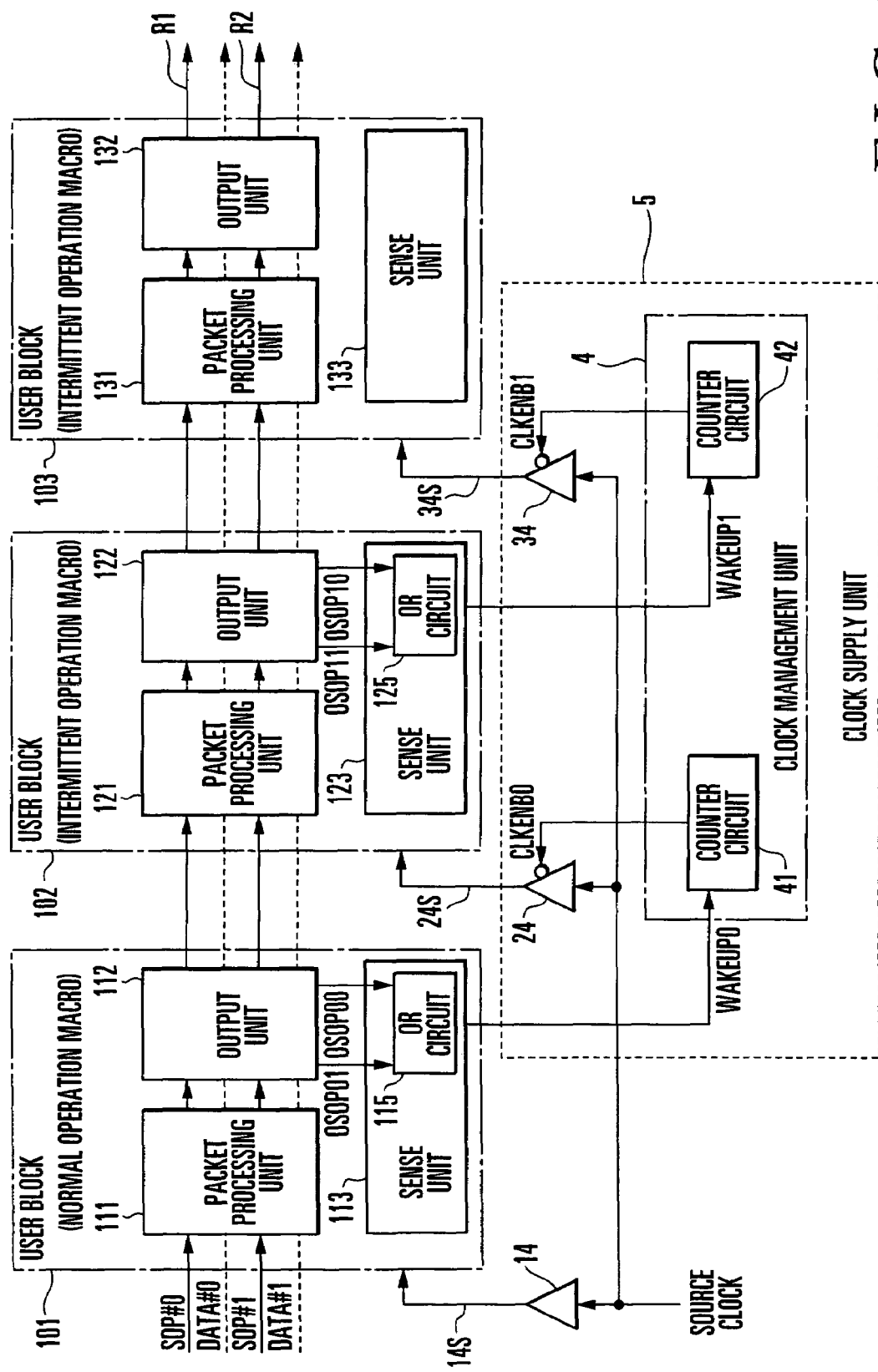
FIG. 3 is a block diagram showing the arrangement of a packet processing circuit according to the second embodiment of the present invention.

FIG. 3 shows the arrangement of a packet processing circuit according to the second embodiment of the present invention. The same reference numerals as in FIG. 1 denote the same constituent elements in FIG. 3.

In the packet processing circuit shown in FIG. 3. user blocks 101, 102, and 103 have output routes R1 and R2 of two packets SOP#0 and SOP#1 and respective associated data DATA#0 and DATA#1.

A description will be made on the basis of the user block 101. The user block 101 is constituted by a packet processing unit 111, output unit 112, and sense unit 113, like the user block 1 shown in FIG. 1.

The output unit 112 outputs, to the sense unit 113, output packet start position identification signals OSOP00 and OSOP01 corresponding to the routes R1 and R2 as second packet output notification signals.

On the basis of the output packet start position identification signals OSOP00 and OSOP01, the sense unit 113 outputs, to a clock supply unit 5, a first packet output notification signal WAKEUP0 which indicates that a packet is output for at least one of the routes R1 and R2. To implement this function, the sense unit 113 has an OR circuit (gate circuit) 115 which generates the first packet output notification signal WAKEUP0 by ORing the received output packet start position identification signals OSOP00 and OSOP01.

Like the user block 101, the user block 102 is constituted by a packet processing unit 121, output unit 122, and sense unit 123. Referring to FIG. 3, reference symbols OSOP10 and OSOP11 denote output packet start position identification signals, and reference numeral 125 denotes an OR circuit of the sense unit 123. The user block 103 is constituted by a packet processing unit 131, output unit 132, and sense unit 133. Since the user block 103 corresponds to the final stage, the output unit 132 need not always have the function as the second signal output unit, and the sense unit 133 may be omitted.

This arrangement can cope with a circuit having the two packet output routes R1 and R2.

When this arrangement is extended, the embodiment can also be applied to a circuit having outputs of a plurality of ports.

What is claimed is:

1. A packet processing circuit comprising:

a plurality of macros each of which processes packet data on the basis of a clock and outputs the processed packet data from at least one route, said macros being cascade-connected; and a clock supply unit which supplies the clock to a macro to be controlled and, when no packet data is output for a predetermined time from all routes of a macro on an input side of said macro to be controlled, stops supplying the clock to said macro to be controlled, wherein said clock supply unit comprises:

a clock buffer which supplies the clock to said macro to be controlled, and a clock management unit which causes said clock buffer corresponding to said macro to be controlled to stop supplying the clock when no packet data is output for the predetermined time from all the routes of said macro on the input side of said macro to be controlled, wherein said macro on the input side comprises a first signal output unit which outputs, to said clock management unit, a first packet output notification signal which indicates that the packet data is output, and said clock management unit comprises a packet output detection unit which causes said clock buffer to start supplying the clock when the first packet output notification signal is enabled and stop supplying the clock when the first packet output notification signal is not enabled again within the predetermined time, wherein said macro on the input side comprises a plurality of routes to output the processed packet data, and said first signal output unit outputs, to said clock management unit, a first packet output notification signal which indicates that the packet data is output from at least one of the routes, and wherein said macro on the input side comprises a second signal output unit which outputs, to said first signal output unit for each of the routes, a second packet output notification signal which indicates that the packet data is output, and said first signal output unit comprises a gate circuit which generates the first packet output notification signal by ORing the received second packet output notification signal.

2. A circuit according to claim 1, wherein said packet output detection unit comprises a counter circuit which detects the predetermined time by counting the number of clocks, said counter circuit resetting a count value when the first packet output notification signal is turned on.

3. A circuit according to claim 2, wherein said counter circuit detects the predetermined time by counting the number of clocks necessary until the packet data passes through said macro on the input side.

* * * * *